United States Patent [19]
Hernquist

[11] 3,798,486
[45] Mar. 19, 1974

[54] METAL VAPOR LASER DISCHARGE DEVICE

[75] Inventor: Karl Gerhard Hernquist, Princeton, N.J.

[73] Assignee: RCA Corporation, New York, N.Y.

[22] Filed: Nov. 6, 1972

[21] Appl. No.: 304,011

[52] U.S. Cl.............. 313/220, 313/225, 331/94.5
[51] Int. Cl............................................ H01s 3/00
[58] Field of Search ............ 313/220, 225; 331/94.5

[56] References Cited
UNITED STATES PATENTS
3,639,804  2/1972  Hernquist .......................... 313/220
3,683,295  8/1972  Hernquist .......................... 331/94.5

Primary Examiner—Herman Karl Saalbach
Assistant Examiner—Darwin R. Hostetter
Attorney, Agent, or Firm—Glenn H. Bruestle; George J. Seligsohn; Irwin M. Krittman

[57] ABSTRACT

A low noise metal vapor laser discharge device of simple construction employing an anode electrode, a cold cathode electrode and condenser therebetween. The device features a relatively long intermediate portion, including a bore region and metal vapor store region, which communicates with the bore region at a plurality of spaced points along the length of the bore region, extending between the anode electrode and condenser.

7 Claims, 2 Drawing Figures

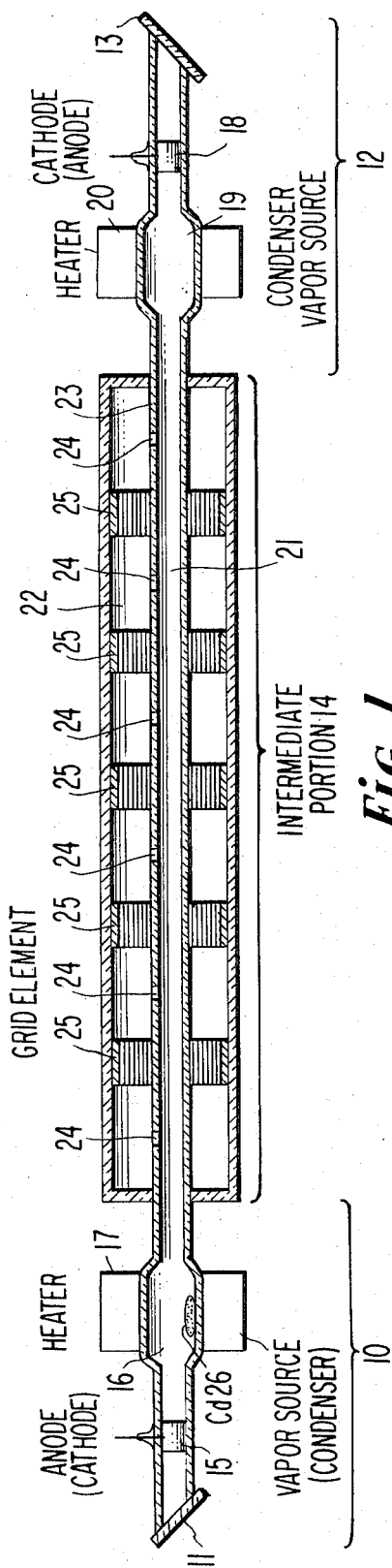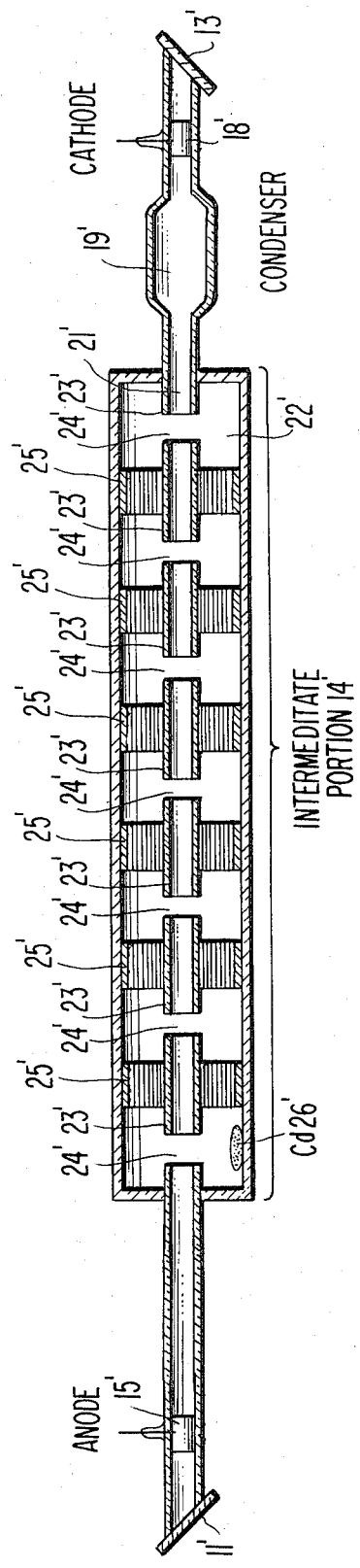

METAL VAPOR LASER DISCHARGE DEVICE

This invention relates to a metal-vapor laser discharge device and, more particularly, to a low-noise, cold-cathode metal vapor laser discharge device.

As disclosed in my U.S. Pat. No. 3,639,804, issued Feb. 1, 1972, a metal-vapor laser discharge device, such as He-Cd, may employ a condenser situated between spaced anode and cathode electrodes for condensing metal vapor which is cataphoretically transported in a direction from the anode electrode to the cathode electrode. This permits a cold cathode electrode to be employed, since the condenser prevents substantially all the metal vapor from reaching and contacting the cathode electrode. Furthermore, as disclosed in said U.S. Pat. No. 3,639,804, by reversing the polarity of the operating voltage applied across the electrodes, either electrode can be employed as the anode electrode and the other employed as the cold cathode electrode. In this case, two spaced condensers are employed between the electrodes, one located in the vicinity of one electrode and the other in the vicinity of the other electrode. Heating metal in solid form initially disposed in that condenser which is in the vicinity of the electrode initially employed as the anode electrode results in that condenser operating as a vapor source to provide metal vapor which is cataphoretically transported to and then condensed in the condenser in the vicinity of the electrode initially employed as the cathode electrode. When all the metal has been evaporated from the first-mentioned condenser and condensed in the second-mentioned condenser, the polarity of the operating voltage may be changed and the second-mentioned condenser heated to now operate as a vapor source for returning by cataphoretic transport metal vapor to the first-mentioned condenser. This "see-saw" operation extends the lifetime of such a metal vapor laser discharge device.

Although a metal vapor laser discharge device of the type disclosed in my U.S. Pat. No. 3,639,804 generates laser radiation efficiently when employed in an operating laser, it has been found that the laser radiation generated thereby includes relatively high noise power output fluctuations, having peak-to-peak amplitudes up to 50 percent of the average DC output, which occur at frequencies on the order of 10 to 100 KHz. This high noise output, which is often undesirable, can be avoided by employing instead a metal-vapor laser discharge device of the type disclosed in my U.S. Pat. No. 3,683,295, issued Aug. 8, 1972.

As more fully described in my U.S. Pat. 3,683,295, a diffusion return path is provided between the cathode region and the anode region for returning cataphoretically transported metal vapor. In order to prevent an unwanted discharge within the return path, but still permit the diffusion of gas therethrough, the return path has a plurality of spaced, conductive grid elements therein. By controlling the density of metal vapor molecules in the cathode vicinity, which in some cases includes a density control heater, the amount of unwanted noise generated may be kept to a minimum, such as less than 5 percent.

Since the effect of the condenser is to alter the density of metal vapor molecules in the cathode region and thereby contribute to the generation of the unwanted noise fluctuations, no condenser is employed between the cathode electrode and the cataphoretically transported gas in the metal vapor laser discharge devices of the type described in my second-mentioned U.S. Pat. No. 3,683,295. Therefore, in this case, the cataphoretically transported metal vapor reaches and directly contacts the cathode electrode in the laser discharge device. Because a cold cathode is adversely affected by direct contact with the metal vapor (resulting in substantially shorter tube life), it is desirable, as is disclosed in said U.S. Pat. No. 3,683,295, that the cathode electrode be a hot cathode. Furthermore, the lack of a condenser requires that a second anode be situated between the cathode electrode and the window or other optical element terminating the end of the discharge device proximate to the cathode electrode, as disclosed in said U.S. Pat. No. 3,683,295, in order to prevent deposition of metal thereon.

Since a cold cathode has the advantages over a hot cathode of being simpler, requiring no external heating supply, and having an indefinite lift, the present invention is directed to a gas laser discharge device in a new arrangement employing both a cold cathode and condenser, like the devices disclosed in my first-mentioned U.S. Pat. No. 3,639,804, and also a plurality of conductive grid elements in a return path, like the laser discharge devices disclosed in my second-mentioned U.S. Pat. No. 3,683,295. This results in a metal vapor discharge device which is nearly as effective as the devices of my second-mentioned U.S. Pat. No. 3,683,295 in reducing the amount of noise fluctuations generated, but which has a longer life and is simpler in construction and less expensive to manufacture. Also the employment of a second anode and its power supply becomes superfluous.

Briefly, the metal-vapor laser discharge device of the present invention comprises an envelope divided into first and second spaced portions and an intermediate portion therebetween interconnecting the first and second portions thereof. A cold cathode electrode is located wholly within the first portion and an anode electrode is located wholly within the second portion, while a condenser is located wholly within the first portion and positioned between the cathode electrode and the intermediate portion. Within the intermediate portion is located separation means for dividing the intermediate portion into an axial bore region and an auxiliary region which communicate with each other only at a predetermined plural number of given spaced points along the length of the intermediate portion. The separation means includes a plurality of longitudinally-distributed, separate, spaced conductive grid elements located wholly within the auxiliary region of the intermediate portion. The noise generated by this metal-vapor laser discharge device is made small by making the overall length occupied by all of the longitudinally-distributed grid elements and all of the spaced points substantially greater than the minimum longitudinal distance from the condenser to the one of the spaced points closest thereto. Preferably, this overall length occupied by all of the longitudinally distributed grid elements and all of the spaced points should be in the order of nine times or more the minimum longitudinal distance from the condenser to the one of the spaced points closest thereto.

These and other features and advantages of the present invention will become more apparent from the following detailed description, taken together with the accompanying drawing, in which:

FIG. 1 is a first illustrative embodiment of the present invention, and

FIG. 2 is a second illustrative embodiment of the present invention.

Referring now to FIG. 1, there is shown a metal-vapor laser discharge device, such as He-Cd, He-Se, He-Zn, etc., known in the art, having a gas-filled envelope consisting of a left terminating portion 10 terminated at its left end by Brewster angle window 11, right terminating portion 12 terminated at its right end by Brewster angle window 13, and an intermediate portion 14 therebetween interconnecting left and right terminating portions 10 and 12.

Located wholly within left terminating portion 10 is electrode 15, which operates alternatively as an anode or a cold cathode electrode. Also located wholly within left terminating portion 10 and situated between electrode 15 and intermediate portion 14 is a chamber 16 having a selectively-operated heater 17 in cooperative relationship therewith. Chamber 16, which initially contains a charge of a metal such as cadmium 26 in solid form, is capable of alternatively operating as a metal vapor source (when heated by heater 17) or as a condenser.

In a similar manner, electrode 18, which alternately operates as a cold cathode electrode or an anode electrode, is wholly located within right terminal portion 12. Also wholly located within right terminal portion 12 and situated intermediate electrode 18 and intermediate portion 14 is chamber 19 having selectively-operated heater 20 in cooperative relationship therewith. Thus, except for the fact that chamber 19 does not have an initial charge of metal and solid form therein, right terminal portion 12 and left terminal portion 10 are in all material respects structurally identical to each other. As will be described below, during operation of the device metal in solid form is deposited in chamber 19. Chamber 19 is capable of alternatively operating as a condenser or, as a vapor source (when it contains metal in solid form and is heated by heater 20).

Intermediate portion 14 is divided into an axial bore region 21 and an auxiliary bore-surrounding region 22 by a single bore tube 23. As shown, the axial bore region 21 defined by single bore tube 23 communicates at its left end with left terminal portion 10 and at its right end with right terminal portion 12. Furthermore, communication between axial bore region 21 and bore-surrounding region 22 is provided only at a predetermined plural number of given spaced points along the length of intermediate portion 14 by each of separate openings 24 in single bore tube 23.

Located wholly within bore-surrounding region 22 are a plurality of longitudinally-distributed, separate, spaced conductive grid elements 25. As shown, each respective grid element 25 is disposed between a pair of adjacent openings 24. Each of grid elements 25 divides an entire cross section of solely bore-surrounding region 22 into a plurality of gas diffusion openings separated from each other by conductive material. The maximum size of any of these openings in grid element 25 is sufficiently small to prevent additional charge from passing therethrough. Furthermore, the spacing between any pair of adjacent grid elements 25 is such that the potential difference existing therebetween in response to an operating voltage of being applied between electrodes 16 and 18 is below the cold cathode breakdown voltage between that pair of adjacent grid elements.

Grid elements 25 are identical in structure to those described in my U.S. Pat. No. 3,683,295, discussed above. Briefly, a grid element may consist of a bundle of thin-walled nickel tubing tacked at the ends to a very thin tungsten mesh. By way of example, each grid element may be made about ½ inch long; individual nickel tubing comprising an individual gas conduit which may be 40 mils in outer diameter with a 2 mil wall. Alternatively, the form that a grid element may take is that of a pair of interleafed rolled sheets of aluminum, one of which is smooth and the other of which is crinkled, to provide a corrugated cylindrical structure. Still other forms each of the plurality of grid elements may take is a single relatively wide cylinder having a tight conductive mesh of high optical transparency at one or both ends theref.

Of particular importance in the present invention is the fact that the overall length occupied by all of the longitudinally-distributed grid elements 25 and all of the spaced openings 24 is substantially greater than the minimum longitudinal distance of either chamber 16 from that one of openings 24 closest thereto or chamber 19 from that one of openings 24 closest thereto. In fact, it is preferable that this overall length be in the order of nine times or more this minimal longitudinal distance (i.e. 90 percent or more of the total distance).

The metal-vapor laser discharge tube shown in FIG. 1 operates as a laser when placed in a suitable optical resonant cavity, as is known in the art, and when a suitable given operating dc voltage is applied across electrodes 15 and 18, as is also known in the art. If the relative potential of this voltage applied to electrode 15 is positive and the relative potential of this voltage applied to electrode 18 is negative, electrode 15 will operate as an anode and electrode 18 will operate as a cold cathode. Alternatively, if the relative polarity of the potentials applied to respective electrodes 15 and 18 are reversed, electrode 15 will operate as a cold cathode and electrode 18 will operate as an anode. It is assumed that initially electrode 15 is operated as an anode electrode and that electrode 18 is operated as a cold cathode electrode. In this case, heater 17 is selectively operated so that chamber 16 operates as a vapor source for evaporating cadmium charge 26 contained therein, while heater 20 remained unoperated so that chamber 19 operates as a condenser.

In response to the given operating voltage being applied, a gas discharge will take place in the gas, which discharge extends between electrode 15, operating as an anode, and electrode 18, operating as a cold cathode, through bore 21. This results in metal vapor present in this discharge being cataphoretically transported in a direction from left to right toward electrode 18 operating as a cold cathode.

If it were not for the presence of the plurality of openings 24, the operation of the device of FIG. 1 would be substantially similar to that of the metal-vapor laser discharge device of my first-mentioned U.S. Pat. No. 3,639,804 in which the metal vapor is cataphoretically transported directly through the bore region to the condenser where it condenses out and is deposited in solid form. This direct cataphoretic transport of the metal vaor molecules from left to right, without the presence of the plurality of openings 24, would result in the density of the metal vapor molecules tending to vary considerably along the length of bore region 21, with a significant drop in the metal vapor molecule density in the vicinity of chamber 19 as the metal vapor molecules condense out. However, as discussed in my second-mentioned U.S. Pat. No. 3,683,295, such changes in metal vapor density cause a substantial amount of undesirable noise output fluctuations in the laser output.

In the present invention, the amount of this undesirable noise output fluctuation is greatly reduced by the presence of bore-surrounding region 22 communicating with bore region 21 through the plurality of openings 24, which operates as a relatively large store of metal vapor for dissipating any tendency for a differential in metal vapor density to develop within the discharge in bore region 21 due to cataphoretic transport. The presence of longitudinally-distributed grid elements 25 prevent any gas discharge from taking place within bore-surrounding region 22, thereby confining the discharge to bore 21.

Once bore-surrounding region 22 initially fills with stored metal vapor instead of diffusing through openings 24 into bore-surrounding region 22, most of the cataphoretically transported vapor in bore 21, reaches the right end of bore 21 into chamber 19, where it condenses and is deposited therein in solid form. Therefore, after an extended time of operation, the metal-vapor laser discharge device shown in FIG. 1 will have substantially all its cadmium charge 26, initially in chamber 16, transported to and condensed in chamber 19.

At this time, all that is necessary for continued operation of the device is that the relative polarity of the potentials applied to electrodes 15 and 18 be reversed, so that electrode 15 now operates as a cold cathode and electrode 18 now operates as an anode, and that heaters 17 and 20 be selectively operated so that chamber 19 now operates as a vapor source and chamber 16 now operates as a condenser. This results in the deposited cadmium now in chamber 19 being cataphoretically transported from right to left back to chamber 16. This "see-saw" operation of the metal vapor discharge device shown in FIG. 1 may be continued indefinitely.

While a relatively negligible amount of noise output fluctuation is contributed by the portion of the device of FIG. 1 defined by the overall length occupied by all of longitudinally distributed grid elements 25 and all of spaced openings 24 of recirculation section 14, the portion of the device of FIG. 1 defined by the minimum longitudinal distance from the condenser to the one of spaced openings 24 closest thereto contributes a noise output fluctuation having a valve determined by its length. Therefore, by making the overall length occupied by all of longitudinally-distributed grid elements 25 and all of spaced openings 24 substantially larger (preferably in the order of 9 times of more) this minimum longitudinal distance from the condenser to the one of the space points closest thereto, the total noise output fluctuation is generated by the device of FIG. 1 can be made nearly as small as the device of my aforesaid U.S. Pat. No. 3,683,295. However, the device of FIG. 1 of the present invention, which employs cold cathode electrodes rather than hot cathode electrodes, has the advantage of being simple in construction.

Except for minor alternative structure, the metal vapor laser discharge device of FIG. 2 is essentially the same as that of FIG. 1. All elements of FIG. 2 corresponding to elements of FIG. 1 have been identified with similar reference numerals, distinguished only by the addition of a prime to each of the reference numerals of FIG. 2. In particular, the device of FIG. 2 does not include the "see-saw" capability of operation of the device of FIG. 1. Therefore, it is possible to place the charge of cadmium 26' directly in the left end of recirculation section 14', as shown. This permits a chamber corresponding to chamber 16 and heaters correspond to both heaters 17 and 20 in FIG. 1 to be omitted in the arrangement of FIG. 2. Another structural distinction between the device of FIG. 2 and FIG. 1 is that the single bore tube 23 of FIG. 1 is replaced by a plurality of spaced bore tube sections 23' in FIG. 2. As shown, each of bore tube sections 23' passes through an aperture in a different one of grid elements 25'. In this case, each of the spaces 24' between or at an end of a bore tube section 23' corresponds in function to each of spaced openings 24 of FIG. 1.

Since these two differences in structure between the devices of FIG. 2 and FIG. 1 are independent of each other, it is to be understood that an embodiment of the present invention having the "see-saw" capability of operation of the device of FIG. 1 together with a plurality of spaced bore tube sections of the device of FIG. 2 is covered by the present invention.

Further, besides the specific configurations of FIGS. 1 and 2, other well known modifications of laser discharge devices, such as the use of integral cavity mirrors, the placing of one or both of the electrodes in its own respective chamber communicating with but outside of the main axial section of the device envelope and/or a multi-section device of the type shown in FIG. 2 of my second-mentioned U.S. Pat. No. 3,683,295, are also contemplated by the present invention.

What is claimed is:

1. A metal-vapor laser discharge device responsive to a given operating voltage applied thereto for producing a discharge therein, said device comprising:
   a. a gas-filled envelope having a longitudinal axis, said envelope being divided into first and second spaced portions, and an intermediate portion therebetween interconnecting sid first and second portions thereof;
   b. a cold cathode electrode located wholly within said first portion and an anode electrode located wholly within said second portion, said gas including as a fraction thereof a given metal vapor which is cataphoretically transported through said intermediate portion in a direction from said anode electrode toward said cathode electrode in response to a discharge in said device;
   c. a condenser located wholly within said first portion and positioned between said cathode electrode and said intermediate portion for condensing transported metal vapor entering said first portion and preventing substantially all of it from reaching said cathode electrode, and
   d. separation means for dividing said intermediate portion into an axial bore region and an auxiliary region which communicate with each other only at a predetermined plural number of given spaced points along the length of said intermediate portion, said separation means including a plurality of longitudinally-distributed, separate, spaced conductive grid elements located wholly within said auxiliary region of said intermediate portion, each of said grid elements dividing an entire cross section of solely said auxiliary region into a plurality of gas diffusing openings separated from each other by conductive material, the maximum size of any of said openings being sufficiently small to prevent a discharge from passing therethrough, and the spacing between any pair of adjacent grid elements being such that the potential difference existing therebetween in response to said operating voltage being applied to said anode and cathode electrodes is below the cold-cathode breakdown voltage between that pair of adjacent grid elements, and wherein the overall length occupied by all of said longitudinally-distributed grid elements and all of said spaced points is substantially greater than the minimum longitudinal distance from said condenser to the one of said spaced points closest thereto.

2. The device defined in claim 1, wherein said overall length occupied by all of said longitudinally-distributed grid elements and all of said spaced points is in the order of nine times or more said minimum longitudinal distance from said condenser to the one of said spaced points closest thereto.

3. The device defined in claim 1, wherein each of said grid elements has a central aperture extending therethrough, and wherein said separation means further includes bore tube means passing longitudinally through said apertures of all said grid elements for dividing said intermediate portion into said axial bore region and said auxiliary region, said bore tube means including a series of longitudinally disposed separate openings therein with each respective grid element being situated between each pair of adjacent openings for thereby providing communication between said regions.

4. The device defined in claim 3, wherein said bore tube means includes a single bore tube passing through all said grid elements, said single bore tube having said separate openings therein.

5. The device defined in claim 3, wherein said bore tube means includes a plurality of separated axially aligned bore tube sections with each single one of said sections passing through a different one of said grid elements, the separation between adjacent ones of said bore tube sections defining said separate openings of said bore tube means.

6. The device defined in claim 1, wherein said metal vapor is cadmium.

7. The device defined in claim 1, wherein in response to a reversal in polarity of said given operating voltage said electrode in said first portion operates as an anode electrode instead of a cold cathode electrode and said electrode in said second portion operates as a cold cathode electrode instead of an anode electrode, wherein said second portion includes a second condenser located wholly therewithin and positioned between said electrode within said second portion and said intermediate portion for condensing transported metal vapor entering said second portion and preventing substantially all of it from reaching said electrode within said second portion whenever it is operating as a cathode electrode, and wherein said second condenser includes means for operating it as a metal vapor source when said electrode within said first portion is operating as a cathode electrode and said first named condenser includes means for operating it as a metal vapor source when said electrode within said second portion is operating as a cathode electrode.

* * * * *

UNITED STATES PATENT OFFICE
CERTIFICATE OF CORRECTION

Patent No. 3,798,486      Dated March 19, 1974

Inventor(s) Karl Gerhard Hernqvist

It is certified that error appears in the above-identified patent and that said Letters Patent are hereby corrected as shown below:

Title page, item [19], item [75], and each of items [56], each occurrence, "Hernquist" should read --Hernqvist--. Column 2, line 19, "lift" should read --life--. Column 5, line 55, "valve" should read --value--. Column 6, line 12, "correspond" should read --corresponding--. Claim 1, column 6, line 46, "sid" should read --said--.

Signed and sealed this 13th day of August 1974.

(SEAL)
Attest:

McCOY M. GIBSON, JR.      C. MARSHALL DANN
Attesting Officer      Commissioner of Patents